(12) United States Patent
Long et al.

(10) Patent No.: US 8,839,043 B1
(45) Date of Patent: Sep. 16, 2014

(54) MANAGING A PORT FAILOVER IN A DATA STORAGE SYSTEM

(75) Inventors: Matthew Long, Uxbridge, MA (US); Anoop George Ninan, Milford, MA (US); Daniel B. Lewis, Newton, MA (US); Shuyu Lee, Acton, MA (US); Dilesh Gopal Naik, Shrewsbury, MA (US); David W. Harvey, Newton, MA (US)

(73) Assignee: EMC Corporation, Hopkinton, MA (US)

( * ) Notice: Subject to any disclaimer, the term of this patent is extended or adjusted under 35 U.S.C. 154(b) by 262 days.

(21) Appl. No.: 13/431,264

(22) Filed: Mar. 27, 2012

(51) Int. Cl.
*G06F 11/00* (2006.01)

(52) U.S. Cl.
USPC .............................. 714/43; 714/44

(58) Field of Classification Search
CPC .................. G06F 11/1423; G06F 11/2053
USPC .............. 714/43, 44, 4.11, 4.2, 5.11
See application file for complete search history.

(56) References Cited

U.S. PATENT DOCUMENTS

| 7,565,568 B1 * | 7/2009 | Kumar et al. ................. 714/6.3 |
| 7,783,779 B1 * | 8/2010 | Scales et al. ................. 709/240 |
| 7,979,517 B1 * | 7/2011 | Wang et al. ................... 709/221 |
| 8,024,426 B2 * | 9/2011 | Trikoz et al. ................. 709/218 |
| 2006/0090094 A1 * | 4/2006 | McDonnell et al. ............. 714/4 |
| 2009/0119547 A1 * | 5/2009 | Hsu et al. ........................ 714/43 |

\* cited by examiner

*Primary Examiner* — Dieu-Minh Le
(74) *Attorney, Agent, or Firm* — Krishnendu Gupta; Jason A. Reyes

(57) ABSTRACT

Method and system for managing port failover in storage system comprising first storage processor and first port and second storage processor and second port. Storage system adapted to communicate with FC switch. Storage system providing first and second names characterizing first and second ports to switch for registration such that the first name associated with first port and second name associated with second port. Storage system detects the state of first and second processors. Failure state in first or second processor activates deregistration of port associated therewith. Storage system providing to switch for re-registration one of the names in response to detecting failure in processor associated with one of the ports. The one of the names provided to switch such that the one of the names characterizing the one of the ports is associated with the other of the ports.

6 Claims, 10 Drawing Sheets

350

| PORT NAME | PORT ID | SWITCH PORT |
|---|---|---|
| apa | v-0 | afb |
| apb | 1 | afb |

MANAGING A PORT FAILOVER IN A DATA STORAGE SYSTEM

TECHNICAL FIELD

The present invention relates to managing a port failover in a data storage system.

BACKGROUND OF THE INVENTION

It is known that new enterprise data centers store ever-larger amounts of critical data that must be immediately and continuously available. To ensure continued connectivity this may necessitate multiple paths between hosts and data storage arrays. For example, this may require multiple physical connections to two or more storage processors within a storage array. This may ensure continued connectivity to the storage array even if there is a failure of a single physical connection or a storage processor.

If an array comprises two or more storage processors it is known to include host-based failover software on the attached hosts to achieve port failover in the event of a failure of a single physical connection or a storage processor. However, this approach requires each attached host to have correctly configured failover software installed. This can be expensive and extremely inconvenient.

SUMMARY OF THE INVENTION

There is disclosed a method and system for use in managing a port failover in a data storage system comprising a first storage processor and an associated first port and a second storage processor and an associated second port. The data storage system adapted to communicate with a Fibre Channel switch. The data storage system provides to the Fibre Channel switch a first unique name characterizing the first port for facilitating registration of the first port with the Fibre Channel switch. The first unique name is provided from the data storage system to the Fibre Channel switch such that the first unique name is associated with the first port. The data storage system provides to the Fibre Channel switch a second unique name characterizing the second port for facilitating registration of the second port with the Fibre Channel switch. The second unique name is provided from the data storage system to the Fibre Channel switch such that the second unique name is associated with the second port. The data storage system detects the operational state of the first and second storage processors in the data storage system. A failure state in connection with one of the first and second storage processors activates deregistration of the port associated with the failed storage processor. The data storage system provides to the Fibre Channel switch one of the first and second unique names characterizing one of the first and second ports for facilitating re-registration of the one of the first and second ports with the Fibre Channel switch in response to detecting a failure state in connection with the storage processor associated with the one of the first and second ports. The one of the first and second unique names is provided from the data storage system to the Fibre Channel switch for facilitating re-registration such that the one of the first and second unique names characterizing the one of the first and second ports is associated with the other of the first and second ports.

Additionally, there is also disclosed a method and system for use in managing a port failover in a data storage system comprising a first storage processor and an associated first port and a second storage processor and an associated second port. The data storage system adapted to communicate with a Fibre Channel switch. The data storage system provides to the Fibre Channel switch a first unique name characterizing the first port for facilitating registration of the first port with the Fibre Channel switch. The first unique name is provided from the data storage system to the Fibre Channel switch such that the first unique name is associated with the first port. The data storage system provides to the Fibre Channel switch a second unique name characterizing the second port for facilitating registration of the second port with the Fibre Channel switch. The second unique name is provided from the data storage system to the Fibre Channel switch such that the second unique name is associated with the second port. The data storage system detects the operational state of the first and second ports in the data storage system. A failure state in connection with one of the first and second ports activates deregistration of the port. The data storage system provides to the Fibre Channel switch one of the first and second unique names characterizing one of the first and second ports for facilitating re-registration of the one of the first and second ports with the Fibre Channel switch in response to detecting a failure state in connection with the one of the first and second ports. The one of the first and second unique names is provided from the data storage system to the Fibre Channel switch for facilitating re-registration such that the one of the first and second unique names characterizing the one of the first and second ports is associated with the other of the first and second ports.

Furthermore, there is disclosed a method and system for use in managing a port failover in a data storage system comprising a first storage processor and first and second ports associated with the first storage processor. The data storage system adapted to communicate with a Fibre Channel switch. The data storage system provides to the Fibre Channel switch a first unique name characterizing the first associated port for facilitating registration of the first associated port with the Fibre Channel switch. The first unique name is provided from the data storage system to the Fibre Channel switch such that the first unique name is associated with the first associated port. The data storage system provides to the Fibre Channel switch a second unique name characterizing the second associated port for facilitating registration of the second associated port with the Fibre Channel switch. The second unique name is provided from the data storage system to the Fibre Channel switch such that the second unique name is associated with the second associated port. The data storage system detects the operational state of the first and second ports associated with the first storage processor in the data storage system. A failure state in connection with one of the first and second associated ports activates deregistration of the port. The data storage system provides to the Fibre Channel switch one of the first and second unique names characterizing one of the first and second associated ports for facilitating re-registration of the one of the first and second associated ports with the Fibre Channel switch in response to detecting a failure state in connection with the one of the first and second associated ports. The one of the first and second unique names is provided from the data storage system to the Fibre Channel switch for facilitating re-registration such that the one of the first and second unique names characterizing the one of the first and second associated ports is associated with the other of the first and second associated ports.

BRIEF DESCRIPTION OF THE DRAWINGS

Features and advantages of the present invention will become more apparent from the following detailed description of exemplary embodiments thereof taken in conjunction with the accompanying drawings in which:

FIG. 7 is a name table in the switch built implementing the technique as described herein;

DETAILED DESCRIPTION

Figure 1:
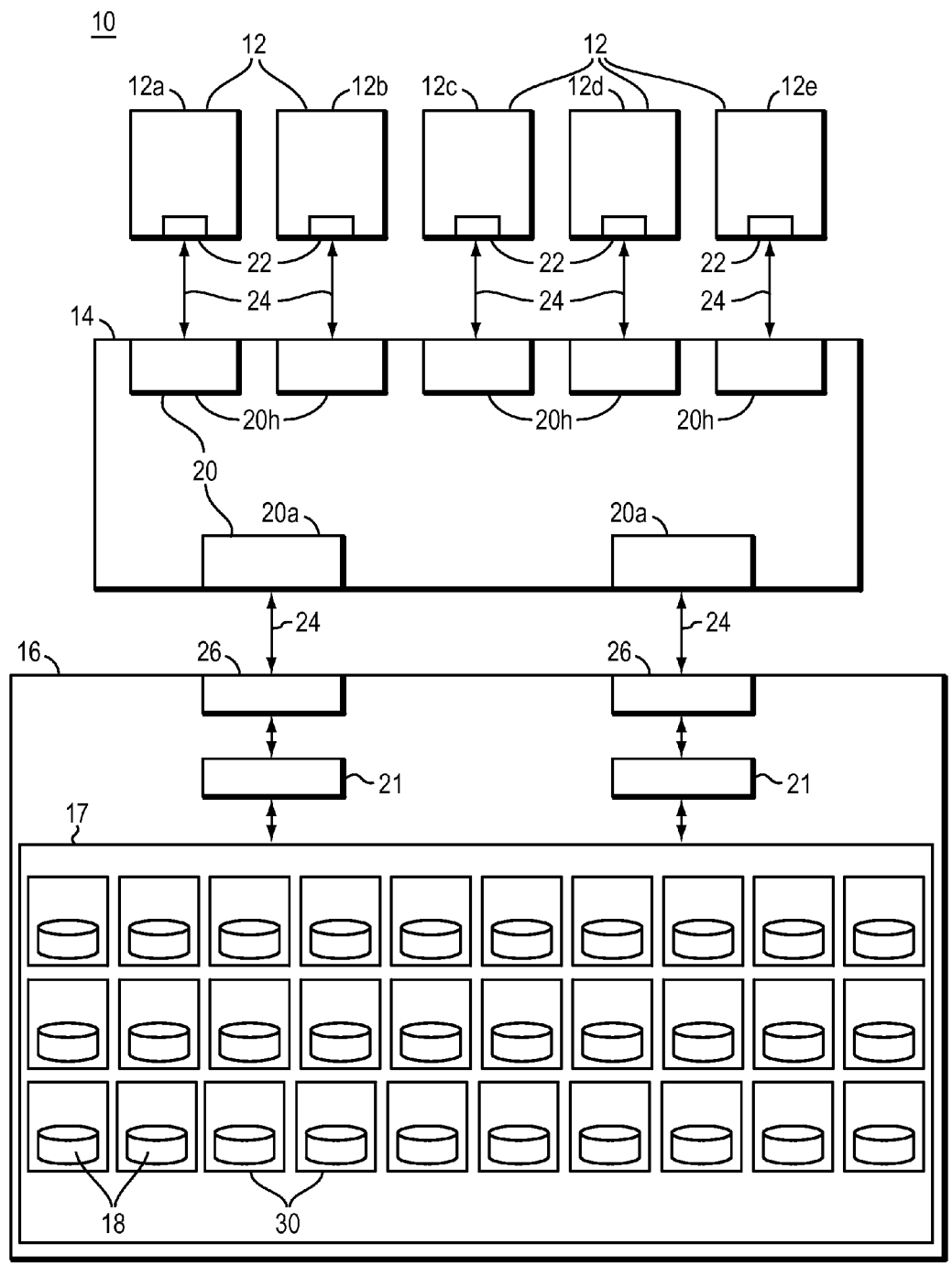
FIG. 1 is a storage area network comprising a data storage system and hosts coupled to a Fibre Channel fabric switch.

The invention can be implemented in numerous ways, including as a process, an apparatus, a system, a computer program embodied on a computer readable storage medium, and/or a processor, such as a processor configured to execute instructions stored on and/or provided by a memory coupled to the processor. In this specification, the implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Described below is a technique for use in managing a port failover in a data storage system. The technique as described herein can leverage the technology Fibre Channel N-Port ID Virtualization ("NPIV") in a Fibre Channel switch for providing port failover capability. The storage system can dynamically move a failed port's identity to another functioning port using NPIV. This can cause the Fibre Channel switch to redirect the traffic previously destined to a port to another port. The hosts see this transition as a simple "bounce" of the Fibre Channel connection and are completely unaware of the redirection occurring. Conversely, similar mechanisms may be used to undo the redirection ("port failback").

Conventionally, storage systems may configure multiple paths between the hosts and the storage system. This may include multiple physical connections to two or more storage processors within the system. This may ensure continued connectivity to the storage system even if there is a failure of a single physical connection or storage processor. Furthermore, the hosts may comprise failover software to detect the failed paths and redirect I/O to the remaining good paths. An advantage of the technique described herein is that the port failover is storage system based and thus host failover software is not required to manage storage array port failover.

Referring to FIG. 1, there is illustrated an example of a storage area network 10 in which the technique described herein can be implemented. The storage area network 10 employs a Fibre Channel fabric topology. It will be known by those skilled in the art that Fibre Channel is a high speed serial transport used in storage systems. The hosts 12 illustrated as 12a, 12b, 12c, 12d and 12e communicate with a Fibre Channel "fabric". In this embodiment, the Fibre Channel "fabric" is a switch 14. A data storage system 16 including a data storage area 17 communicates with the switch 14. It will be appreciated by those skilled in the art that the terms storage system or storage array or array may be used interchangeably throughout this disclosure with the same meaning. In this embodiment, the data storage area 17 within the storage system 16 comprises disk drives 18 and the hosts 12 may communicate with the disk drives 18 via a cross-point Fibre Channel connection through the switch 14.

The switch 14 includes switch ports 20. Host facing switch ports are labeled as 20h. Storage system or array facing switch ports are labeled as 20a. Host ports 22 on the hosts communicate via Fibre Channel links 24 to host-facing switch ports 20h on the switch 14. Physical ports 26 on the storage system or array 16 are associated with storage processors 21 and communicate via Fibre Channel links 24 to array-facing switch ports 20a on the switch 14. The disks 18 within the storage system 16 are organized into logical units ("LUNs") 30. "LUN" is used to describe a logical unit of physical storage space. The LUNs are exported by the ports 26 for access by the hosts 12 via the Fibre Channel links 24 and switch 14. As herein shown, each disk appears to be configured as a separate LUN, though it is understood that a LUN can encompass part of a disk, or parts of multiple disks, or multiple complete disks. The arrangement shown is chosen for convenience of description.

Each Fibre Channel device including but not limited to host ports and array ports has two identifying characteristics—a name and an address. Fibre Channel names, known as "world wide names", are unique—every Fibre Channel device has its own unique name. Each Fibre Channel device also has an address referred to in Fibre Channel parlance as an "ID". The IDs are used for directing information between hosts and storage systems. Port addresses are commonly referred to as "port IDs". LUN addresses are commonly referred to as "LUN numbers". After initialization, the hosts 12 communicate with the ports 26 and LUNs 30 by sending messages to the appropriate port ID and LUN number.

Figure 2:
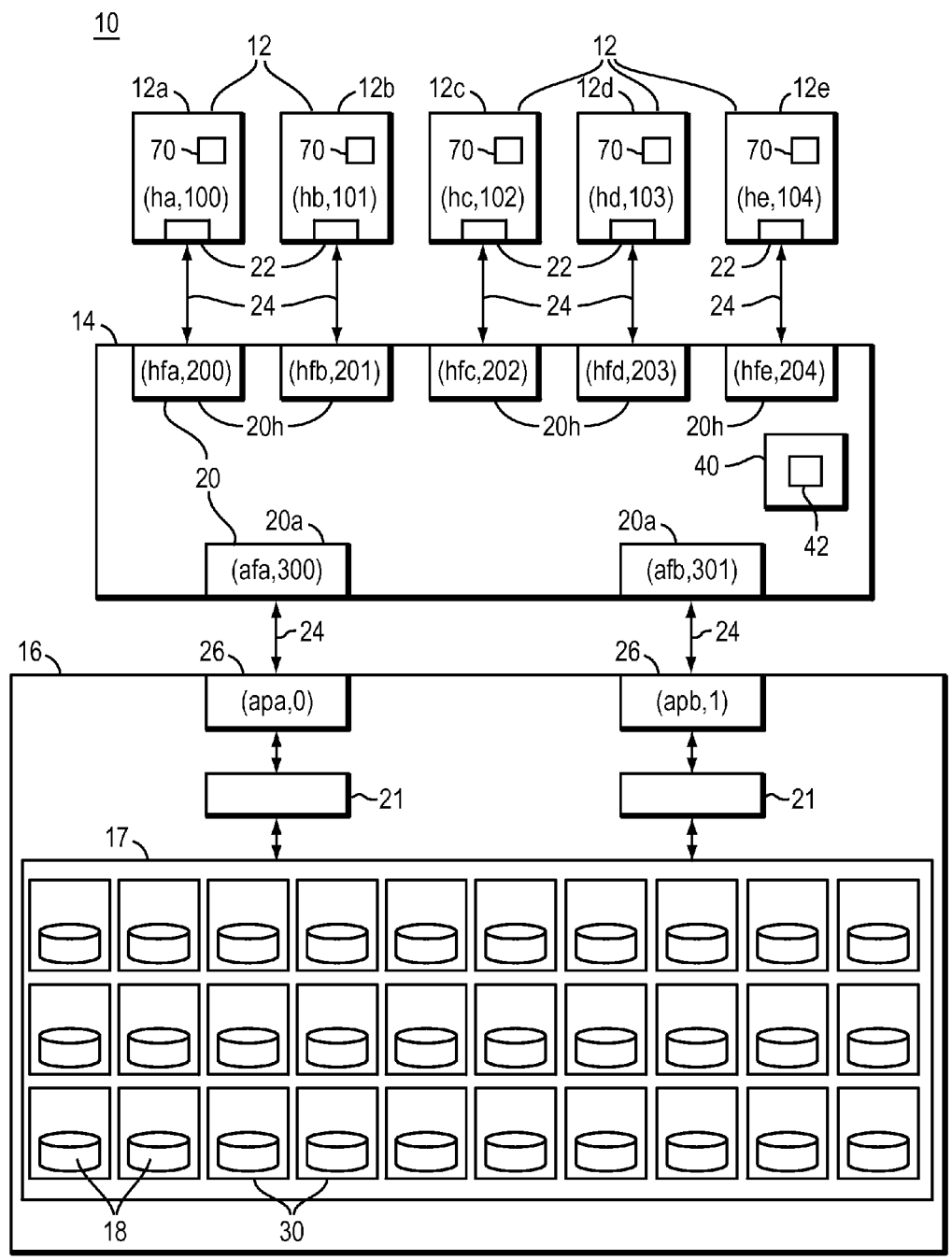
FIG. 2 is the storage area network of FIG. 1 showing port names and IDs.

Referring to FIG. 2, there is illustrated the storage area network of FIG. 1 showing port names and IDs. In a Fabric topology, the switch 14 assigns IDs to the ports 22 and ports 26 during initialization. IDs as described in the Fibre Channel specification are actually 24 bit quantities containing several fields. However, in this figure the names and IDs are shown symbolically with alphanumeric symbols for simplicity of explanation. The names and IDs of each port and LUN are shown as a pair (name, ID). For instance, the port 22 on the host 12a is shown to have a name and ID of (ha, 100). The names and IDs for the ports 22 on the hosts 12b-e are (hb, 101), (hc, 102), (hd, 103) and (he, 104). The switch ports 20h are shown to have names and IDs (hfa, 200), (hfb, 201), (hfc, 202), (hfd, 203), and (hfe, 204). The switch ports 20a are shown to have names and IDs (afa, 300) and (afb, 301). The ports 26 are shown to have names and IDs (apa, 0), and (apb, 1). It will be appreciated that the LUNs 30 will also have a name and LUN number. However, for ease of illustration, this is not shown in the figure.

Figure 3A:
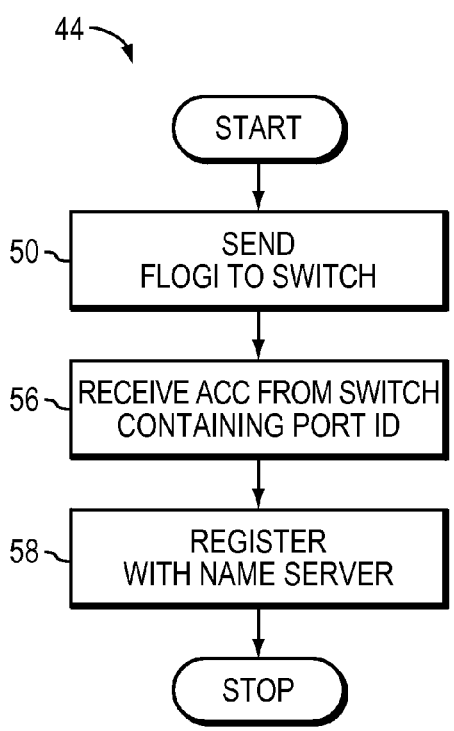
FIG. 3A is a flow diagram representing the operation of the data storage system during initialization.
Figure 3B:
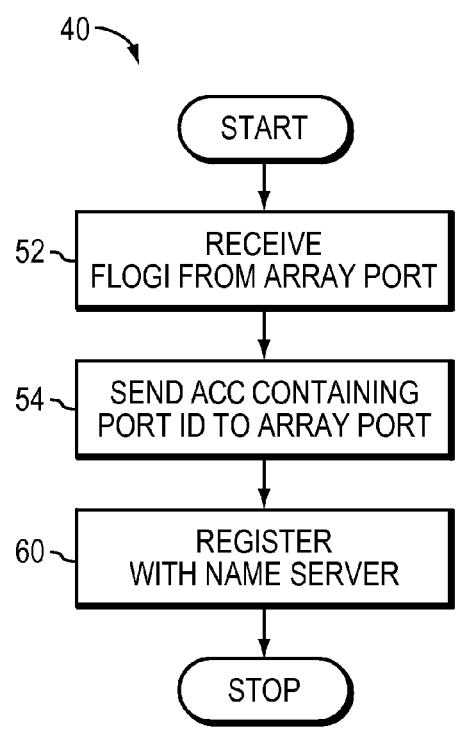
FIG. 3B is a flow diagram representing the operation of the switch during initialization.

Referring to FIGS. 3A and 3B, there is illustrated two flow diagrams representing the operation of the data storage system and the switch, respectively, during initialization. It will be appreciated that in this embodiment the Fibre Channel switch 14 includes a name server database 40. The name server database 40 is used by the switch 14 to assign IDs to ports 22 and ports 26 during initialization. The name server database 40 includes a name server table 42 that is used by the switch to resolve IDs to names. First, for each storage system or array port (i.e. ports 0 and 1), the data storage system sends a port login "FLOGI" command to the switch 14 containing the port name (FIG. 3A step 50). The port logins are received by the switch 14 (FIG. 3B step 52). When the switch 14 receives a port login command, it responds by sending an acknowledgement message to the data storage system (FIG. 3B step 54). This acknowledgement message contains a port ID for the port that was logged in. The acknowledgement message is received by the data storage system (FIG. 3A step 56). Then, a registration process is performed by the switch 14 (FIG. 3A step 58, FIG. 3B step 60). During the registration process, the name server table 42 containing port names and corresponding port IDs is built and distributed to nodes registered to receive it.

Figure 4:
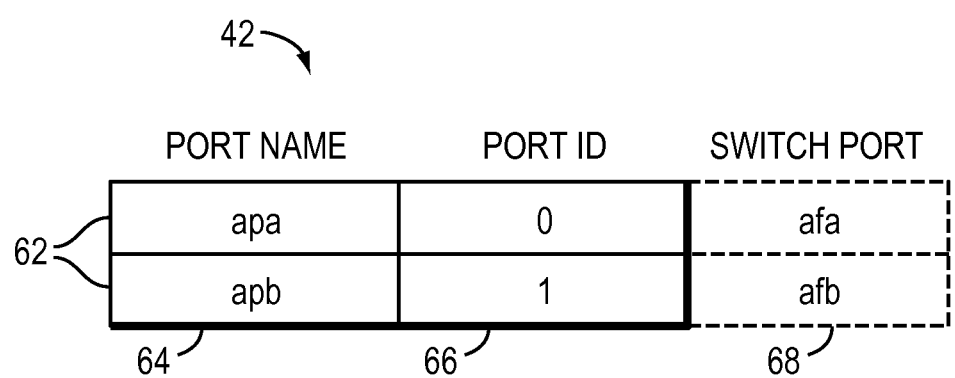
FIG. 4 is a name table managed by name server database in the switch.

Referring to FIG. 4, there is illustrated an example of name table 42 managed by name server database in the switch. It will be appreciated that the figure shows only the portions of the table 42 sufficient to contribute to an understanding of the table. The table 42 includes entries 62 having a port name field 64 and a port address ID field 66. In this embodiment, the table 42 also includes a third field 68 identifying the switch port name that received the port login "FLOGI" command during initialization. It is believed that the field 68 may assist in giving a better understanding of the invention described herein. It can be seen from the figure that an entry 62 in the table 42 includes the port name apa and port ID 0 and the switch port name afa that received the port login during initialization. Additionally, there is a further entry 62 in the table 42 including the port name apb and port ID 1 and the switch port name afb that received the port login during initialization. The switch 14 then sends the table 42, or at least the entries relating to the port name and ID, to all members of the SAN 10 registered to receive state change notifications. This includes the hosts 12. The hosts 12 now have the port IDs of the ports 26 so Fibre Channel communications between the hosts 12 and array 16 can ensue.

It will be appreciated by those skilled in the art that now that the hosts have IDs to access the ports, they can also learn what LUNs are available. LUN names and numbers are managed at the storage system level. Each host 12 sends a query to each port 26 ID in turn requesting a list of available LUN numbers. Once the LUN numbers for a given port ID are known, the host 12 is able to query each LUN 30 by using a combination of the port ID and LUN number to access the LUNs 30. The host 12 then queries each LUN 30 for its corresponding LUN name. Once the host has gathered all this information, it builds a directory LUN table (not shown) that relates LUN names, port IDs, and LUN numbers. During operation, hosts 12 refer to LUNs 30 by their LUN numbers. In order to access a LUN 30, a host port 22 sends a message whose Fibre Channel address includes the port ID and LUN number. The switch 14 parses the port ID portion of the address in order to forward the message to the identified port 26. The storage system 16 then uses the LUN number portion of the address to access the proper LUN 30 within the system 16.

Figure 5:
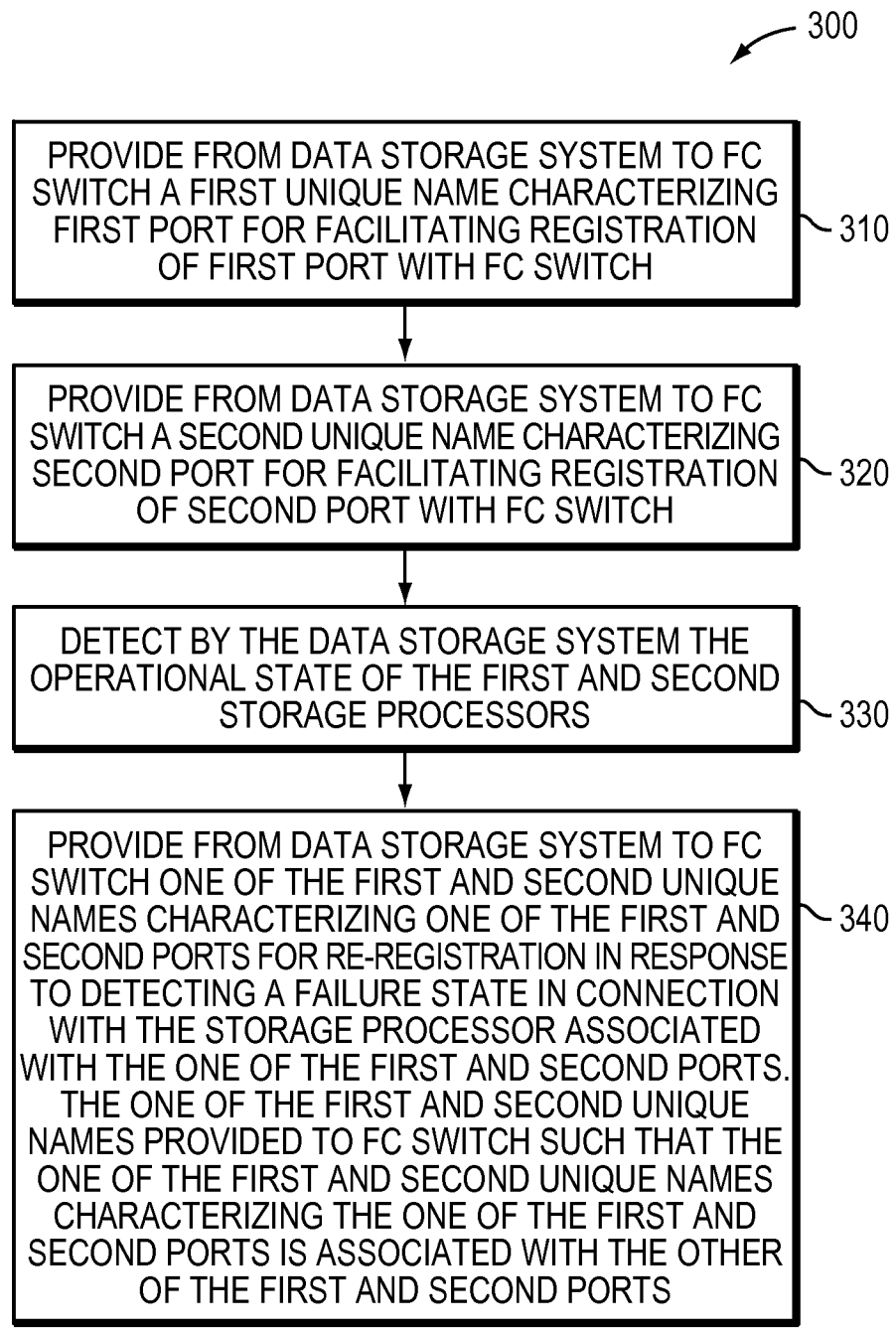
FIG. 5 is a flowchart summarizing the steps of a technique for use in managing port failover in the data storage system.

Referring to FIG. 5, there is illustrated a technique 300 for use in managing a port failover in a data storage system. The storage system 16, similar to that as described and illustrated with respect to FIGS. 1 and 2, comprises a first storage processor 21 and an associated first port 26 and a second storage processor 21 and an associated second port 26. Additionally, the storage system comprises a communications channel (not shown) between the two storage processors 21 for facilitating communication between the respective processors. In this embodiment, the data storage system is also adapted to communicate with a Fibre Channel switch 14 such that read and write I/Os can be directed to the first and second ports 26. Moreover, in the embodiment, the Fibre Channel switch 14 comprises NPIV technology such that a single physical port in the data storage system 16 may have multiple virtual ports associated therewith.

The technique as described herein comprises providing 310 from the data storage system 16 to the Fibre Channel switch 14 a first unique name characterizing the first port 26 for facilitating registration of the first port 26 with the Fibre Channel switch 14. The first unique name provided from the data storage system 16 to the Fibre Channel switch 14 such that the first unique name is associated with the first port 26. For example, the data storage system 16 may send a port login "FLOGI" command to the switch 14 containing the port name. It will be appreciated that the first storage processor 21 associated with the first port 26 may provide or send the port login "FLOGI" command to the switch containing the world wide name ('apa') of the first port 26. The port login may be received by the switch 14 and the switch may respond in turn by sending to the data storage system a first port address or ID ('0') for the first port such that the first unique name and the first port address are associated with the first port. It will be appreciated that a registration process may be performed by the switch 14 such that a name server table 42 can be built.

The technique further comprises providing 320 from the data storage system 16 to the Fibre Channel switch 14 a second unique name characterizing the second port for facilitating registration of the second port with the Fibre Channel switch. The second unique name provided from the data storage system 16 to the Fibre Channel switch 14 such that the second unique name is associated with the second port. The step may be performed in a similar manner to the previous step 310 with the exception that the second storage processor 21 may provide or send a port login "FLOGI" command to the switch containing the world wide name ('apb') of the second port. The switch may respond in turn by sending a second port address or ID ('1') for the second port and registering the second port such that the second unique name and the second port address are associated with the second port. The registration process may be performed by the switch 14 such that a name server table 42, as described above, containing port names and their corresponding port IDs may be built and distributed to nodes registered to receive it. It will be appreciated that the table may be substantially similar to the table 42 as described with respect to FIG. 4.

The technique comprises detecting 330 by the data storage system 16 the operational state of the first and second storage processors 21 in the data storage system. It will be appreciated that the operational states may include an active state and a failure state. It will also be appreciated that a failure state in connection with one of the first and second storage processors 21 activates deregistration of the port associated with the failed storage processor. For example, it will be understood from the foregoing that the storage processors are connected via a reliable communication channel. If one storage processor detects that the other storage processor is not responsive it may be concluded that the other storage processor has failed. It will also be appreciated that if either of the storage processors fails the world wide name of the port associated therewith provided for registration will be deregistered from the name server table 42. It will also be appreciated by those skilled in the art that the term 'a failure state' includes both planned failures and unplanned failures. For example, an upgrade of a storage processor may be considered a planned failure. An unplanned failure may be considered a more serious issue in which the storage processor unexpectedly fails.

Additionally, the technique comprises providing 340 from the data storage system 16 to the Fibre Channel switch 14 one of the first and second unique names characterizing one of the first and second ports 26 for facilitating re-registration of the one of the first and second ports with the Fibre Channel switch in response to detecting a failure state in connection with the storage processor associated with the one of the first and second ports. In accordance with the technique as described herein, the one of the first and second unique names is provided from the data storage system 16 to the Fibre Channel switch 14 for facilitating re-registration such that the one of the first and second unique names characterizing the one of the first and second ports 26 is associated with the other of the first and second ports. For example, if the first storage processor fails, the first port associated therewith may be deregistered or removed from the name server table 42 in the switch 14. In such a scenario, the second storage processor 21 associated with the second port 26 detects that the other first storage processor has failed and provides the world wide name associated with the first port ('apa') to the switch 14 for registration such that the world wide name of the first port ('apa') will be associated with the second port. In this embodiment, it will be appreciated that the storage processors may exchange relevant port-related data so that if a storage processor fails the surviving storage processor may have access to all the information about the port of the failed storage processor to take the necessary action in accordance with the technique. The switch as discussed above may comprise NPIV such that a single physical port, for example, the second port may have multiple virtual ports associated therewith. The technique as described herein may leverage the NPIV technology such that a virtual first address is issued in response to providing the world wide name of the first port to the switch for re-registration of the first port with the switch 14. The hosts are informed of the new virtual address and consequently I/O may be directed to the second port based on the second port address associated with the second world wide name and also the virtual first address associated with the first world wide name. This will be discussed in further detail below.

Figure 6:
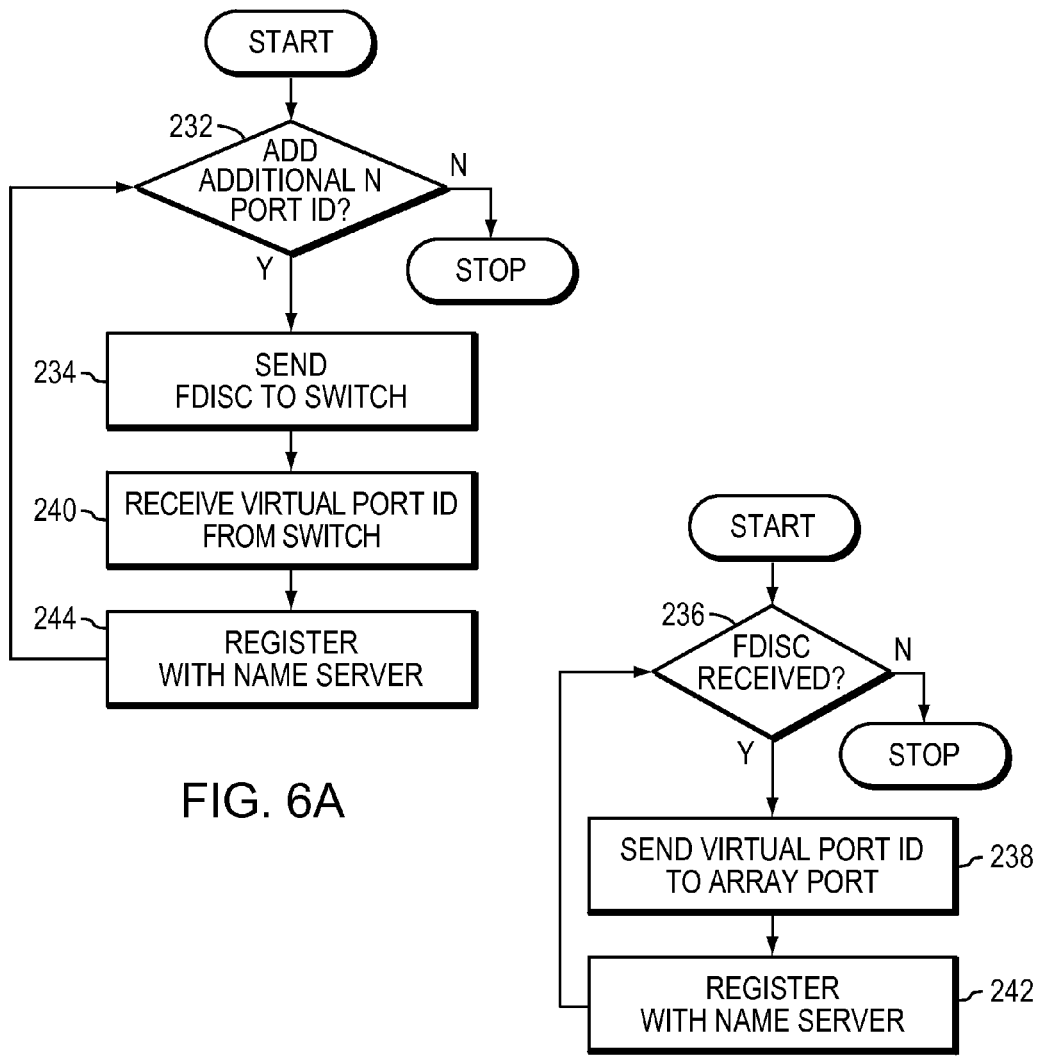
FIG. 6A is a flow diagram representing the operation of the data storage system when virtual port IDs are implemented on the data storage system.
FIG. 6B is a flow diagram representing the operation of the switch when virtual port IDs are implemented on the data storage system.

Referring to FIGS. 6A and 6B, there is illustrated two flowcharts representing the operation of the data storage system and switch, respectively, when virtual port addresses or IDs are implemented on the data storage system. It will be appreciated in the example provided herein that the ports in the data storage system were registered during initialization as described with respect to FIG. 3. Furthermore, it will be appreciated that if a virtual port ID is required by an array port 26 (step 232) a "FDISC" command containing port name (step 234) is sent to the switch. For example, it will be understood that an array port may require a virtual port ID by virtue of a failure in connection with a storage processor and the consequential deregistration of the port associated therewith. The switch 14 receives the FDISC command (step 236) and responds by sending a virtual port ID to the storage system (step 238). It will be understood that if the FDISC command is received on a link where the port is not FLOGI-ed in, the FDISC command will be rejected. In other words, a physical port must be logged-in in order to be able to request and receive virtual port IDs. The storage system receives the virtual port ID from the switch 14a (step 240). The switch 14a and storage system then perform the registration process to add the port name and virtual port ID to the name server table 42 (steps 242, 244). The FDISC command and response is repeated if further virtual ID's are required for each physical port (steps 232-244).

Referring to FIG. 7, there is illustrated an example of a name server table built in accordance with the technique as described herein. In this example, the first storage processor associated with the first port has failed. Because of the failure, the world wide name associated with the first port is no longer active in the switch's database. It has been deregistered. This causes the data storage system to send an "FDISC" command containing the port name ('apa') to the switch for re-registration such that the world wide name ('apa') of the first port may be associated with the second port. It will be appreciated that the second storage processor associated with the second port may provide the first unique name ('apa') associated with the first port to the switch for re-registration. The switch comprising NPIV sends a virtual first port address or ID to the second port and re-registers and associates the first world wide name with the second port. In this example, the switch will direct I/O to the second port, which registered both the first and second world wide names, based on the first virtual address or ID and the second address or ID. The table 350 as illustrated includes a port name field 351 and a port address ID field 352. The port name field includes the name of the first port 'apa' and the second port 'apb'. The port address ID field comprises the virtual address 'V-0' of port name 'apa' and the address '1' of port name 'apb'. It will also be appreciated that a third field is illustrated identifying the port that received the "FDISC" command (steps 234 and 236). This is included to clearly illustrate that the I/O will be directed to the storage system by the switch through switch port afb and the second port of the storage system. The switch sends the table, or at least entries relating to port name and ID, to all members of the SAN registered to receive state change notification. Accordingly, the hosts have the port addresses or IDs of the ports so Fibre Channel communications between the hosts and storage system or array can ensue.

It will be appreciated by those skilled in the art that now that the hosts have IDs to access the ports, the hosts can determine what LUNs are available as discussed above. For example, each host 12 may send a query to each port 26 ID requesting a list of available LUN numbers. Once the LUN numbers for a given port ID are known, the host 12 may query each LUN 30 by using a combination of the port ID and LUN number to access the LUNs 30. The host 12 may then query each LUN 30 for its corresponding LUN name. Once the host has gathered all this information, it may build a LUN table that relates LUN names, port IDs, and LUN numbers.

Figure 8:
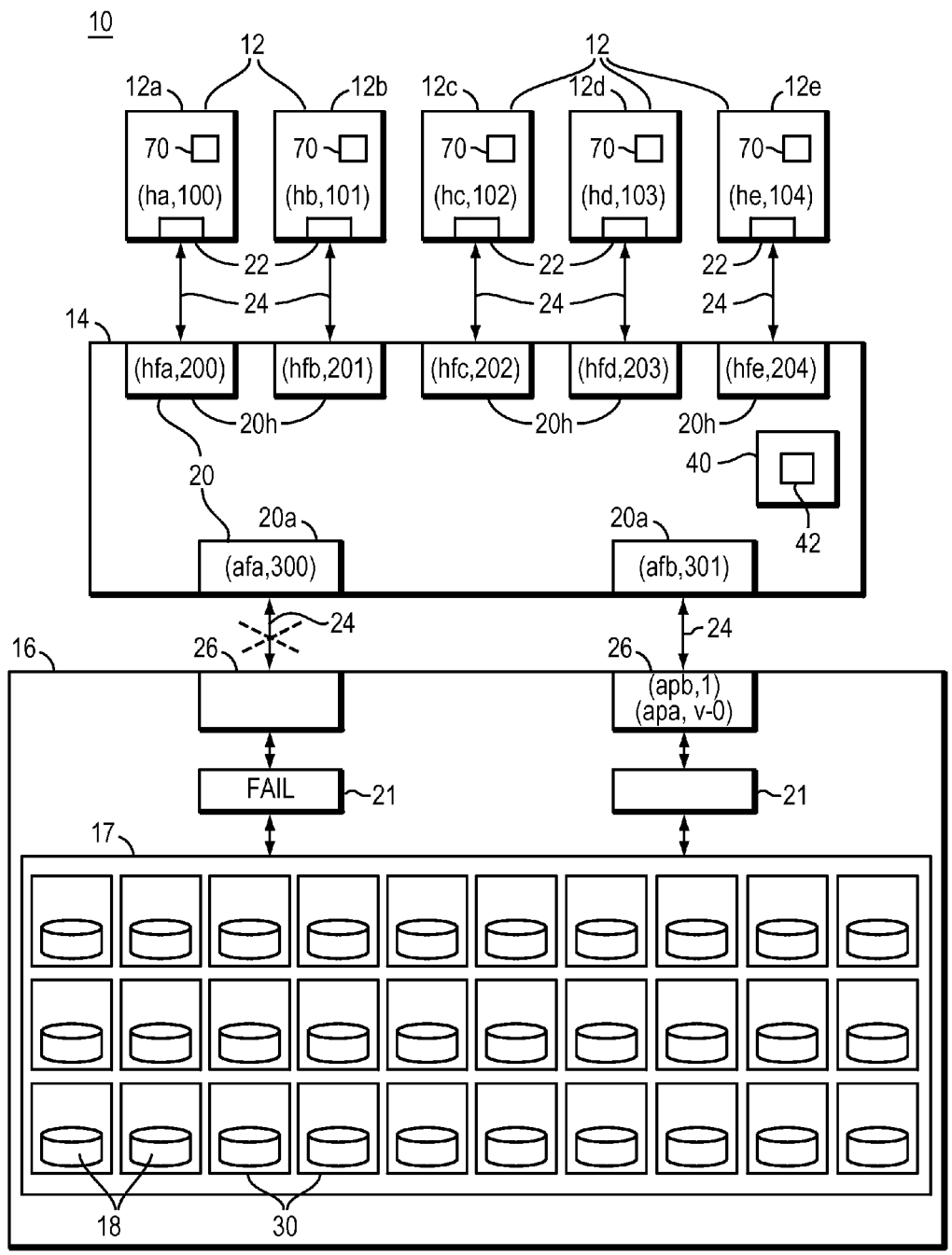
FIG. 8 is the storage area network showing port names and IDs implementing the technique as described herein.

Referring to FIG. 8, there is illustrated a representation of a storage area network implementing the technique as described herein. In this example, the first storage processor associated with the first port has failed, and the Fibre Channel link 24 between first port 26 and array-facing switch port afa, as illustrated in the figure, cannot facilitate communication between switch and storage system. Accordingly, in accordance with the technique, the second storage processor associated with the second port provides the first unique name ('apa') associated with the first port to the switch for re-registration. The switch comprising NPIV sends a virtual first port address or ID to the second port and re-registers and associates the first world wide name with the second port. It can be seen from the figure that the world wide names 'apb' and 'apa' are both associated with the second port in accordance with the technique.

Figure 9:
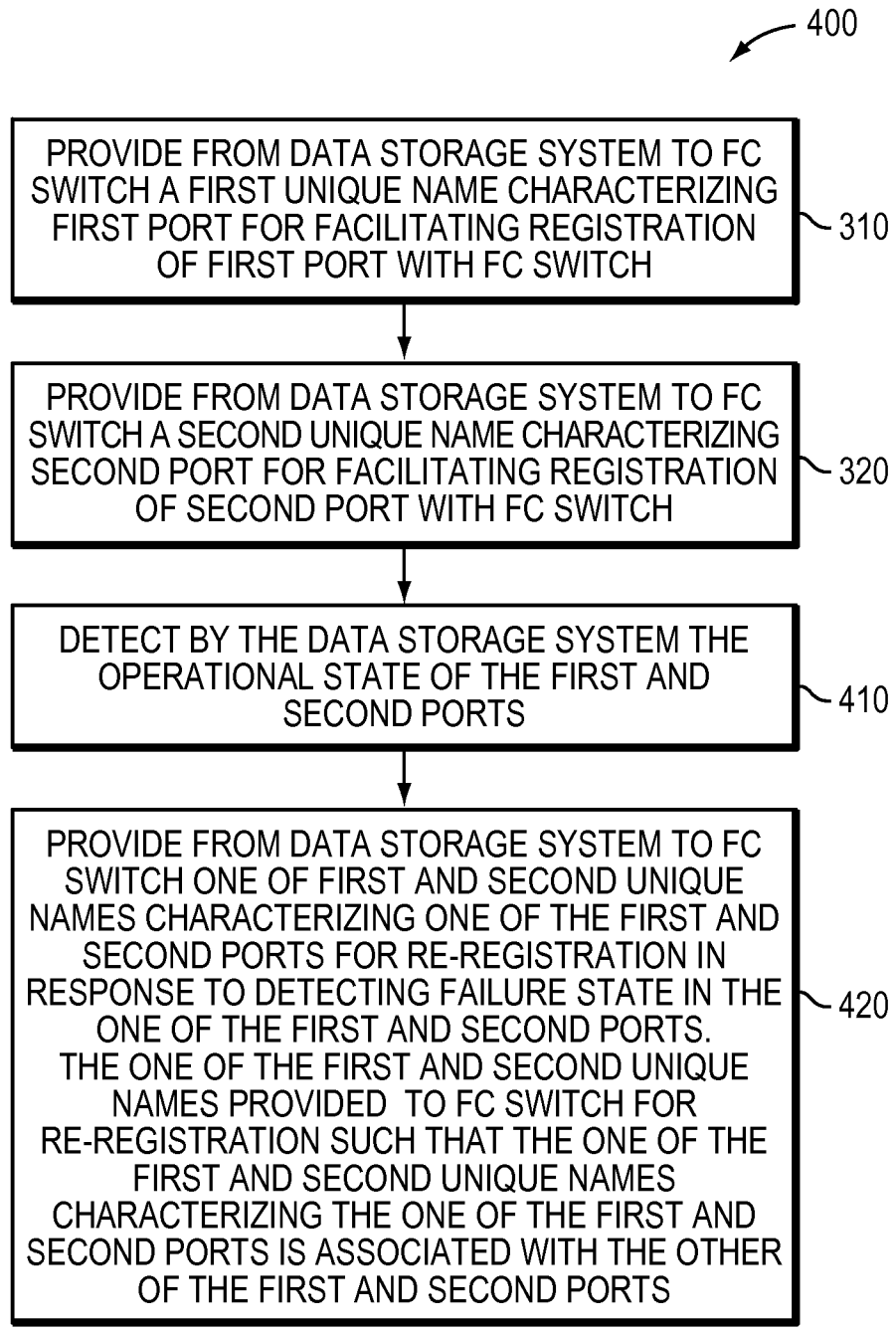
FIG. 9 is a flowchart summarizing the steps of a further technique for use in managing port failover in the data storage system.

Referring to FIG. 9, there is illustrated a further technique 400 for use in managing a port failover in a data storage system. The technique is substantially similar to the technique 300 as described with respect to FIG. 5. The steps 310 and 320 are the same as FIG. 5 and similar comments apply to similar steps. However, the technique with respect to FIG. 9 comprises detecting 410 the operational state of the first and second ports. A failure state in connection with one of the first and second ports activating deregistration of the unique name of the port. The technique herein differs from the previous technique in that it monitors and detects the state of the ports. For example, if the cable to the port is pulled then the technique may detect a failure state in connection with the port. The technique also comprises providing 420 from the data storage system to the Fibre Channel switch one of the first and second unique names characterizing one of the first and second ports for facilitating re-registration of the one of the first and second ports with the Fibre Channel switch in response to detecting a failure state in connection with the one of the first and second ports. The one of the first and second unique names provided from the data storage system to the Fibre Channel switch for facilitating re-registration such that the one of the first and second unique names characterizing the one of the first and second ports is associated with the other of the first and second ports. For example, if the first port fails, the first port may be deregistered by removing the name from the name server table in the switch. In such a scenario, the second storage processor associated with the second port may provide the world wide name associated with the first port to the switch for registration such that the world wide name of the first port may be associated with the second port. As discussed above, the switch may comprise NPIV such that a single physical port, for example, the second port, may have multiple virtual ports associated therewith. The technique as described herein may leverage the NPIV technology such that a virtual first address is issued in response to providing the world wide name of the first port to the switch.

Figure 10:
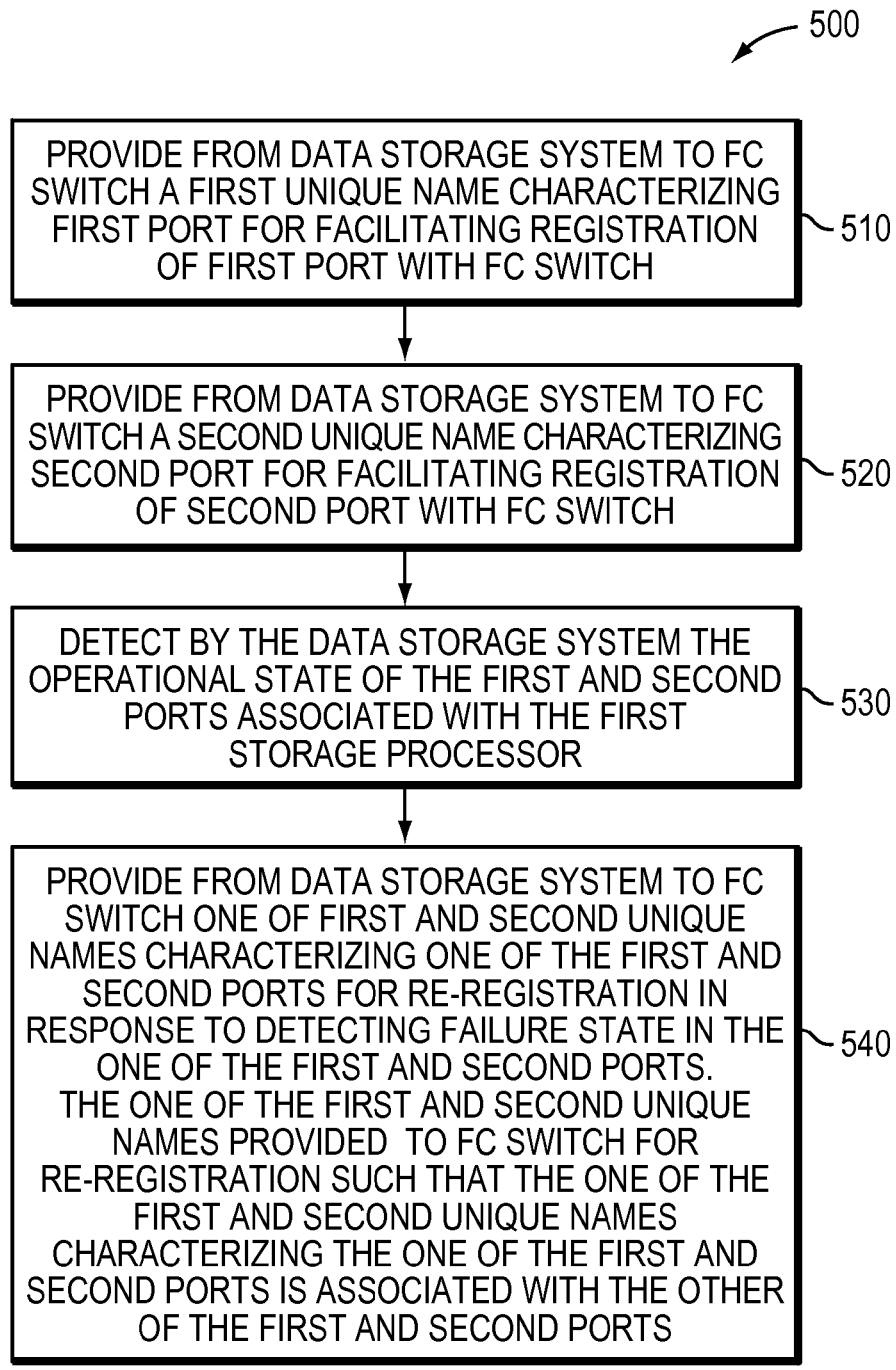
FIG. 10 is a flowchart summarizing the steps of a still further technique for use in managing port failover in the data storage system.

Referring to FIG. 10, there is illustrated a further technique 500 for use in managing a port failover in a data storage system comprising a storage processor having more than one port associated therewith. The technique as described in this figure differs from the previous techniques in that in the embodiment the data storage system comprises a first storage processor and first and second ports associated with the first storage processor. In this embodiment, the data storage system provides 510 to the Fibre Channel switch a first unique name characterizing a first port associated with the first storage processor for facilitating registration of the first associated port with the Fibre Channel switch. The first unique name is provided from the data storage system to the Fibre Channel switch such that the first unique name is associated with the first associated port. Furthermore, the data storage system provides 520 to the Fibre Channel switch a second unique name characterizing the second port associated with the first storage processor for facilitating registration of the second associated port with the Fibre Channel switch. The second unique name is provided from the data storage system to the Fibre Channel switch such that the second unique name is associated with the second associated port. Additionally, the data storage system detects 530 the operational state of the first and second ports associated with the first storage processor in the data storage system. A failure state in connection with one of the first and second associated ports activates deregistration of the port. Moreover, the data storage system provides 540 to the Fibre Channel switch one of the first and second unique names characterizing one of the first and second associated ports for facilitating re-registration of the one of the first and second associated ports with the Fibre Channel switch in response to detecting a failure state in connection with the one of the first and second associated ports. The one of the first and second unique names is provided from the data storage system to the Fibre Channel switch for facilitating re-registration such that the one of the first and second unique names characterizing the one of the first and second associated ports is associated with the other of the first and second associated ports. For example, if the first port fails, the first port may be deregistered by removing the name from the name server table in the switch. In such a scenario, the first storage processor associated with both the first and second ports may provide the world wide name associated with the first port to the switch for registration such that the world wide name of the first port may be associated with the second port. As discussed above, the switch may comprise NPIV such that a single physical port, for example, the second port, may have multiple virtual ports associated therewith. The technique as described herein may leverage the NPIV technology such that a virtual first address is issued in response to providing the world wide name of the first port to the switch for re-registration.

While the above techniques describe port failover in a data storage system, it will be appreciated that the techniques may in some embodiments be configured for managing port failover between different data storage systems.

It will also be understood that in certain embodiments a subset of LUNs may be visible only to one port. It will be appreciated that in these embodiments if a port were to fail the LUNs may also be visible to the virtualized port upon successful failover.

While the invention has been disclosed in connection with preferred embodiments shown and described in detail, modifications and improvements thereon will become readily apparent to those skilled in the art. Accordingly, the spirit and scope of the present invention should be limited only by the following claims.

What is claimed is:

1. A method for use in managing a port failover in a data storage system, wherein the data storage system comprises a first storage processor and an associated first port and a second storage processor and an associated second port, the data storage system being adapted to communicate with a Fibre Channel switch, the method comprising:

providing from the data storage system to the Fibre Channel switch a first unique name characterizing the first port for facilitating registration of the first port with the Fibre Channel switch, wherein the first unique name is provided from the data storage system to the Fibre Channel switch such that the first unique name is associated with the first port;

in response to providing the first unique name to the Fibre Channel switch for facilitating registration, receiving in the data storage system a first port address from the Fibre Channel switch, wherein the first unique name and the first port address are associated with the first port;

providing from the data storage system to the Fibre Channel switch a second unique name characterizing the second port for facilitating registration of the second port with the Fibre Channel switch, wherein the second unique name is provided from the data storage system to the Fibre Channel switch such that the second unique name is associated with the second port;

in response to providing the second unique name to the Fibre Channel switch for facilitating registration, receiving in the data storage system a second port address from the Fibre Channel switch, wherein the second unique name and the second port address are associated with the second port;

detecting by the data storage system the operational state of the first and second storage processors in the data storage system, wherein a failure state in connection with one of the first and second storage processors activates the deregistration of the port associated with the failed storage processor;

in response to detecting a failure state in connection with the storage processor associated with one of the first and second ports, providing from the data storage system to the Fibre Channel switch one of the first and second unique names characterizing the one of the first and second ports for facilitating re-registration of the one of the first and second ports with the Fibre Channel switch;

in response to providing the first unique name to the Fibre Channel switch for facilitating re-registration, receiving in the data storage system a first virtual address from the Fibre Channel switch, wherein the first unique name and the first virtual address are associated with the second port; and in response to providing the second unique name to the Fibre Channel switch for facilitating re-registration, receiving in the data storage system a second virtual address from the Fibre Channel switch, wherein the second unique name and the second virtual address are associated with the first port.

2. A system for use in managing a port failover in a data storage system, wherein the data storage system comprises a first storage processor and an associated first port and a second storage processor and an associated second port, the data storage system being adapted to communicate with a Fibre Channel switch, the system comprising:

first logic providing from the data storage system to the Fibre Channel switch a first unique name characterizing the first port for facilitating registration of the first port with the Fibre Channel switch, wherein the first unique name is provided from the data storage system to the Fibre Channel switch such that the first unique name is associated with the first port;

in response to providing the first unique name to the Fibre Channel switch for facilitating registration, second logic receiving in the data storage system a first port address from the Fibre Channel switch, wherein the first unique name and the first port address are associated with the first port;

third logic providing from the data storage system to the Fibre Channel switch a second unique name characterizing the second port for facilitating registration of the second port with the Fibre Channel switch, wherein the second unique name is provided from the data storage system to the Fibre Channel switch such that the second unique name is associated with the second port;

in response to providing the second unique name to the Fibre Channel switch for facilitating registration, fourth logic receiving in the data storage system a second port address from the Fibre Channel switch, wherein the second unique name and the second port address are associated with the second port;

fifth logic detecting by the data storage system the operational state of the first and second storage processors in the data storage system, wherein a failure state in connection with one of the first and second storage processors activates the deregistration of the port associated with the failed storage processor;

in response to detecting a failure state in connection with the storage processor associated with one of the first and second ports, sixth logic providing from the data storage system to the Fibre Channel switch one of the first and second unique names characterizing the one of the first and second ports for facilitating re-registration of the one of the first and second ports with the Fibre Channel switch;

in response to providing the first unique name to the Fibre Channel switch for facilitating re-registration, seventh logic receiving in the data storage system a first virtual address from the Fibre Channel switch, wherein the first unique name and the first virtual address are associated with the second port; and in response to providing the second unique name to the Fibre Channel switch for facilitating re-registration, eighth logic receiving in the data storage system a second virtual address from the Fibre Channel switch, wherein the second unique name and the second virtual address are associated with the first port.

3. A method for use in managing a port failover in a data storage system, wherein the data storage system comprises a first storage processor and an associated first port and a second storage processor and an associated second port, the data storage system being adapted to communicate with a Fibre Channel switch, the method comprising:

providing from the data storage system to the Fibre Channel switch a first unique name characterizing the first port for facilitating registration of the first port with the Fibre Channel switch, wherein the first unique name is provided from the data storage system to the Fibre Channel switch such that the first unique name is associated with the first port;

in response to providing the first unique name to the Fibre Channel switch for facilitating registration, receiving in the data storage system a first port address from the Fibre Channel switch, wherein the first unique name and the first port address are associated with the first port;

providing from the data storage system to the Fibre Channel switch a second unique name characterizing the second port for facilitating registration of the second port with the Fibre Channel switch, wherein the second unique name is provided from the data storage system to the Fibre Channel switch such that the second unique name is associated with the second port;

in response to providing the second unique name to the Fibre Channel switch for facilitating registration, receiving in the data storage system a second port address from the Fibre Channel switch, wherein the second unique name and the second port address are associated with the second port;

detecting by the data storage system the operational state of the first and second ports in the data storage system, wherein a failure state in connection with one of the first and second ports activates the deregistration of the port;

in response to detecting a failure state in connection with one of the first and second ports, providing from the data storage system to the Fibre Channel switch one of the first and second unique names characterizing the one of the first and second ports for facilitating re-registration of the one of the first and second ports with the Fibre Channel switch;

in response to providing the first unique name to the Fibre Channel switch for facilitating re-registration, receiving in the data storage system a first virtual address from the Fibre Channel switch, wherein the first unique name and the first virtual address are associated with the second port; and in response to providing the second unique name to the Fibre Channel switch for facilitating re-registration, receiving in the data storage system a second virtual address from the Fibre Channel switch, wherein the second unique name and the second virtual address are associated with the first port.

4. A system for use in managing a port failover in a data storage system, wherein the data storage system comprises a first storage processor and an associated first port and a second storage processor and an associated second port, the data storage system being adapted to communicate with a Fibre Channel switch, the system comprising:

first logic providing from the data storage system to the Fibre Channel switch a first unique name characterizing the first port for facilitating registration of the first port with the Fibre Channel switch, wherein the first unique name is provided from the data storage system to the Fibre Channel switch such that the first unique name is associated with the first port;

in response to providing the first unique name to the Fibre Channel switch for facilitating registration, second logic receiving in the data storage system a first port address from the Fibre Channel switch, wherein the first unique name and the first port address are associated with the first port;

third logic providing from the data storage system to the Fibre Channel switch a second unique name characterizing the second port for facilitating registration of the second port with the Fibre Channel switch, wherein the second unique name is provided from the data storage system to the Fibre Channel switch such that the second unique name is associated with the second port;

in response to providing the second unique name to the Fibre Channel switch for facilitating registration, fourth logic receiving in the data storage system a second port address from the Fibre Channel switch, wherein the second unique name and the second port address are associated with the second port;

fifth logic detecting by the data storage system the operational state of the first and second ports in the data storage system, wherein a failure state in connection with one of the first and second ports activates the deregistration of the port;

in response to detecting a failure state in connection with one of the first and second ports, sixth logic providing from the data storage system to the Fibre Channel switch one of the first and second unique names characterizing the one of the first and second ports for facilitating re-registration of the one of the first and second ports with the Fibre Channel switch;

in response to providing the first unique name to the Fibre Channel switch for facilitating re-registration, seventh logic receiving in the data storage system a first virtual address from the Fibre Channel switch, wherein the first unique name and the first virtual address are associated with the second port; and in response to providing the second unique name to the Fibre Channel switch for facilitating re-registration, eighth logic receiving in the data storage system a second virtual address from the Fibre Channel switch, wherein the second unique name and the second virtual address are associated with the first port.

5. A method for use in managing a port failover in a data storage system, wherein the data storage system comprises a first storage processor and first and second ports associated with the first storage processor, the data storage system being adapted to communicate with a Fibre Channel switch, the method comprising:

providing from the data storage system to the Fibre Channel switch a first unique name characterizing the first associated port for facilitating registration of the first associated port with the Fibre Channel switch, wherein the first unique name is provided from the data storage system to the Fibre Channel switch such that the first unique name is associated with the first associated port;

in response to providing the first unique name to the Fibre Channel switch for facilitating registration, receiving in the data storage system a first port address from the Fibre Channel switch, wherein the first unique name and the first port address are associated with the first port;

providing from the data storage system to the Fibre Channel switch a second unique name characterizing the second associated port for facilitating registration of the second associated port with the Fibre Channel switch, wherein the second unique name is provided from the data storage system to the Fibre Channel switch such that the second unique name is associated with the second associated port;

in response to providing the second unique name to the Fibre Channel switch for facilitating registration, receiving in the data storage system a second port address from the Fibre Channel switch, wherein the second unique name and the second port address are associated with the second port;

detecting by the data storage system the operational state of the first and second ports associated with the first storage processor in the data storage system, wherein a failure state in connection with one of the first and second associated ports activates the deregistration of the port;

in response to detecting a failure state in connection with one of the first and second associated ports, providing from the data storage system to the Fibre Channel switch one of the first and second unique names characterizing the one of the first and second associated ports for facilitating re-registration of the one of the first and second associated ports with the Fibre Channel switch;

in response to providing the first unique name to the Fibre Channel switch for facilitating re-registration, receiving in the data storage system a first virtual address from the Fibre Channel switch, wherein the first unique name and the first virtual address are associated with the second port; and in response to providing the second unique name to the Fibre Channel switch for facilitating re-registration, receiving in the data storage system a second virtual address from the Fibre Channel switch, wherein the second unique name and the second virtual address are associated with the first port.

6. A system for use in managing a port failover in a data storage system, wherein the data storage system comprises a first storage processor and first and second ports associated with the first storage processor, the data storage system being adapted to communicate with a Fibre Channel switch, the system comprising:

first logic providing from the data storage system to the Fibre Channel switch a first unique name characterizing the first associated port for facilitating registration of the first associated port with the Fibre Channel switch, wherein the first unique name is provided from the data storage system to the Fibre Channel switch such that the first unique name is associated with the first associated port;

in response to providing the first unique name to the Fibre Channel switch for facilitating registration, second logic receiving in the data storage system a first port address from the Fibre Channel switch, wherein the first unique name and the first port address are associated with the first port;

third logic providing from the data storage system to the Fibre Channel switch a second unique name characterizing the second associated port for facilitating registration of the second associated port with the Fibre Channel switch, wherein the second unique name is provided from the data storage system to the Fibre Channel switch such that the second unique name is associated with the second associated port;

in response to providing the second unique name to the Fibre Channel switch for facilitating registration, fourth logic receiving in the data storage system a second port address from the Fibre Channel switch, wherein the second unique name and the second port address are associated with the second port;

fifth logic detecting by the data storage system the operational state of the first and second ports associated with the first storage processor in the data storage system, wherein a failure state in connection with one of the first and second associated ports activates the deregistration of the port;

in response to detecting a failure state in connection with one of the first and second associated ports, sixth logic providing from the data storage system to the Fibre Channel switch one of the first and second unique names characterizing the one of the first and second associated ports for facilitating re-registration of the one of the first and second associated ports with the Fibre Channel switch;

in response to providing the first unique name to the Fibre Channel switch for facilitating re-registration, seventh logic receiving in the data storage system a first virtual address from the Fibre Channel switch, wherein the first unique name and the first virtual address are associated with the second port; and in response to providing the second unique name to the Fibre Channel switch for facilitating re-registration, eighth logic receiving in the data storage system a second virtual address from the Fibre Channel switch, wherein the second unique name and the second virtual address are associated with the first port.

* * * * *